(12) United States Patent
Cao et al.

(10) Patent No.: US 11,831,423 B2
(45) Date of Patent: Nov. 28, 2023

(54) METHOD AND APPARATUS FOR COMMUNICATIONS WITH CHANNEL PUNCTURING

(71) Applicant: NXP USA, Inc., Austin, TX (US)

(72) Inventors: Rui Cao, Sunnyvale, CA (US); Hongyuan Zhang, Fremont, CA (US); Liwen Chu, San Ramon, CA (US)

(73) Assignee: NXP USA, Inc., Austin, TX (US)

( * ) Notice: Subject to any disclaimer, the term of this patent is extended or adjusted under 35 U.S.C. 154(b) by 199 days.

(21) Appl. No.: 17/139,671

(22) Filed: Dec. 31, 2020

(65) Prior Publication Data

US 2021/0211221 A1 Jul. 8, 2021

Related U.S. Application Data

(60) Provisional application No. 63/093,446, filed on Oct. 19, 2020, provisional application No. 63/042,981, filed on Jun. 23, 2020, provisional application No. 63/015,615, filed on Apr. 26, 2020, provisional application No. 62/957,774, filed on Jan. 6, 2020.

(51) Int. Cl.
| | | |
|---|---|---|
| *H04L 1/00* | (2006.01) | |
| *H04B 7/0413* | (2017.01) | |
| *H04L 5/00* | (2006.01) | |
| *H04W 72/04* | (2023.01) | |
| *H04W 72/044* | (2023.01) | |

(52) U.S. Cl.
CPC ......... *H04L 1/0013* (2013.01); *H04B 7/0413* (2013.01); *H04L 5/0007* (2013.01); *H04W 72/044* (2013.01)

(58) Field of Classification Search
CPC ............ H04W 72/0453; H04W 72/044; H04B 7/0413; H04B 7/0452; H04L 1/0013; H04L 5/0007; H04L 5/0023; H04L 5/0094; H04L 5/0053; H04L 1/0023; H04L 1/0068
See application file for complete search history.

(56) References Cited

U.S. PATENT DOCUMENTS

| | | | |
|---|---|---|---|
| 9,131,528 B2 | 9/2015 | Zhang et al. | |
| 10,320,551 B2 | 6/2019 | Cao et al. | |
| 11,212,705 B2 | 12/2021 | Cao et al. | |
| 2006/0218459 A1* | 9/2006 | Hedberg | H03M 13/353 714/752 |

(Continued)

OTHER PUBLICATIONS

Harry Newton, Newton's Telecom Dictionary, 2016, United Book Press, 30th Edition, p. 201 (Year: 2016).*

(Continued)

*Primary Examiner* — Maharishi V Khirodhar
*Assistant Examiner* — Kenneth P Hunt (57) ABSTRACT

Embodiments of a method and apparatus for communications are disclosed. In an embodiment, a method for wireless communications involves, in a punctured transmission, encoding, bits in a non-legacy preamble portion of a packet to include bandwidth information and resource allocation information, and signaling, in the packet, the bandwidth information and resource allocation information for at least one of a single-user-multiple-input multiple-output (SU-MIMO) technique, a multiple-user-multiple-input multiple-output (MU-MIMO) technique, and an orthogonal frequency-division multiple access (OFDMA) technique.

12 Claims, 6 Drawing Sheets

(56) References Cited

U.S. PATENT DOCUMENTS

| | | | |
|---|---|---|---|
| 2016/0112157 A1* | 4/2016 | Li | H04L 1/0061 |
| | | | 714/807 |
| 2017/0041171 A1* | 2/2017 | Li | H04L 5/0053 |
| 2018/0227952 A1 | 8/2018 | Kim et al. | |
| 2019/0149640 A1 | 5/2019 | Chen et al. | |
| 2019/0280919 A1* | 9/2019 | Sadeghi | H04L 41/0803 |
| 2019/0297674 A1* | 9/2019 | Min | H04W 80/08 |
| 2020/0008185 A1* | 1/2020 | Chen | H04L 5/0044 |
| 2020/0382998 A1 | 12/2020 | Cao et al. | |
| 2021/0045151 A1* | 2/2021 | Chen | H04W 74/002 |
| 2021/0135779 A1* | 5/2021 | Gan | H04L 5/0053 |

OTHER PUBLICATIONS

Stephen McQuerry, Implementing a WLAN, Cisco Press, Jun. 17, 2008, p. 2 https://www.ciscopress.com/articles/article.asp?p=1156068&seqNum=4 (Year: 2008).*

Paul Vrancken, IEEE 802.11 Wireless Local Area Networks, Nov. 25, 2006, Wireless Data Networks, p. 1, http://www.wirelesscommunication.nl/reference/chaptr01/wrlslans/80211_page1.htm (Year: 2006).*

IEEE, "IIEEE P802.11ax™/D4.1", Draft Standard for Information technology—Telecommunications and information exchange between systems Local and metropolitan area networks—Specific requirements, Apr. 2019, 754 pgs.

IEEE, "IEEE P802.11ax™/D4.3", Draft Standard for Information technology—Telecommunications and information exchange between systems Local and metropolitan area networks Specific requirements, Aug. 2019, 782 pgs.

IEEE, "IEEE P802.11ax™/D6.0", Draft Standard for Information technology—Telecommunications and information exchange between systems Local and metropolitan area networks Specific requirements, Nov. 2019, 780 pgs.

IEEE, "IEEE P802.11a-REVmd™/D2.1", Draft Standard for Information technology—Telecommunications and information exchange between systems Local and metropolitan area networks Specific requirements, Feb. 2019, 4,604 pgs.

IEEE, "IEEE P802.11-REVmd™/D1.6", Draft Standard for Information technology—Telecommunications and Information exchange between systems Local and metropolitan area networks—Specific requirements, Oct. 2018, 4594 pgs.

* cited by examiner

METHOD AND APPARATUS FOR COMMUNICATIONS WITH CHANNEL PUNCTURING

CROSS-REFERENCE TO RELATED APPLICATIONS

This application is entitled to the benefit of U.S. Provisional Patent Application Ser. No. 62/957,774, filed on Jan. 6, 2020, and U.S. Provisional Patent Application Ser. No. 63/015,615, filed on Apr. 26, 2020, and U.S. Provisional Patent Application Ser. No. 63/042,981, filed on Jun. 23, 2020, and U.S. Provisional Patent Application Ser. No. 63/093,446, filed on Oct. 19, 2020, each of which is incorporated by reference herein.

BACKGROUND

In wireless communications, devices, e.g., access point (AP) multi-link devices (MLDs) or non-AP MLDs, e.g., STA multi-link devices (STA MLDs), can transmit various types of information, such as bandwidth information and resource allocation information for communication between devices using different transmission techniques. As an example, a communications device in a multi-link Basic Service Set (BSS) may wirelessly transmit a Physical layer Protocol Data Unit (PPDU) to communicate information and update device parameters. However, as the protocols for transmitting information change, there is a need to efficiently account for multiple different techniques.

SUMMARY

Embodiments of a method and apparatus for communications are disclosed. In an embodiment, a method for wireless communications involves, in a punctured transmission, encoding, bits in a non-legacy preamble portion of a packet to include bandwidth information and resource allocation information, and signaling, in the packet, the bandwidth information and resource allocation information for at least one of a single-user-multiple-input multiple-output (SU-MIMO) technique, a multiple-user-multiple-input multiple-output (MU-MIMO) technique, and an orthogonal frequency-division multiple access (OFDMA) technique.

In an embodiment, signaling the bandwidth information and resource allocation information for at least one of the SU-MIMO technique, the MU-MIMO technique, and the OFDMA technique involves signaling the bandwidth information and resource allocation information for at least one of the SU-MIMO technique, the MU-MIMO technique, and the OFDMA technique in a separate manner.

In an embodiment, signaling the bandwidth information and resource allocation information for at least one of the SU-MIMO technique, the MU-MIMO technique, and the OFDMA technique involves signaling the bandwidth information and resource allocation information for at least one of the SU-MIMO technique, the MU-MIMO technique, and the OFDMA technique in a unified manner.

In an embodiment, a first set of bits signal the packet's entire bandwidth, and wherein, the first set of bits are comprised of 3-bits for the packet's entire bandwidth.

In an embodiment, a second set of bits signal punctured channel information, and wherein, the second set of bits are comprised of at least 5-bits.

In an embodiment, a third set of bits signal the resource allocation information of the OFDMA technique.

In an embodiment, at least 8 bits are used to signal the resource allocation information for each unit of bandwidth information.

In an embodiment, 9×N bits are used to signal the resource allocation information for an entire bandwidth.

An embodiment of a communications device is also disclosed. The communications device includes a processor configured to encode bits in a non-legacy preamble portion of a packet to include bandwidth information and resource allocation information and signal, in the packet, the bandwidth information and resource allocation information for at least one of a SU-MIMO technique, a MU-MIMO technique, and an OFDMA technique.

In an embodiment, the packet's signal for the bandwidth information and resource allocation information for at least one of the SU-MIMO technique, the MU-MIMO technique, and the OFDMA technique involves the signal for the bandwidth information and resource allocation information for at least one of the SU-MIMO technique, the MU-MIMO technique, and the OFDMA technique being in a separate manner.

In an embodiment, the packet's signal for the bandwidth information and resource allocation information for at least one of the SU-MIMO technique, the MU-MIMO technique, and the OFDMA technique involves the signal for the bandwidth information and resource allocation information for at least one of the SU-MIMO technique, the MU-MIMO technique, and the OFDMA technique being in a unified manner.

In an embodiment, a first set of bits signal the packet's entire bandwidth, and wherein, the first set of bits are comprised of 3-bits for the packet's entire bandwidth.

In an embodiment, a second set of bits signal punctured channel information, and wherein, the second set of bits are comprised of at least 5-bits.

In an embodiment, a third set of bits signal the resource allocation information of the OFDMA technique.

In an embodiment, at least 8 bits are used to signal the resource allocation information for each unit of bandwidth information.

In an embodiment, 9×N bits are used to signal the resource allocation information for an entire bandwidth.

Another embodiment of a method for communications is disclosed. The method involves, at a communications device, encoding, bits in a non-legacy preamble portion of a packet to include bandwidth information for a Basic Service Set (BSS) with a bandwidth greater than 160 MHz, and signaling, in the packet, the bandwidth information for the BSS with the bandwidth greater than 160 MHz.

In an embodiment, the bandwidth information bits are in U-SIG of the non-legacy preamble portion of the packet.

In an embodiment, the bandwidth information bits in U-SIG may signal at least one of (i) when a first set of channels allow 320 MHz transmission (320 MHz-1), and (ii) when a second set of channels allow 320 MHz transmission (320 MHz-2).

In an embodiment, U-SIG includes at least three bandwidth information bits, and wherein, the three bandwidth information bits indicate a signal bandwidth option of at least one of 20 MHz, 40 MHz, 80 MHz, 160 MHz, 320 MHz-1 and 320 MHz-2.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a multi-link device (MLD) such as an access point (AP) MLD of a wireless local area network (WLAN) transmits data to at least one associated station (STA) MLD. The AP MLD is configured to operate with associated STA MLDs according to at least a first communication protocol. The first communication protocol may be referred to herein as an Extremely High Throughput (EHT) communication protocol, or Institute of Electrical and Electronics Engineers (IEEE) 802.11be communication protocol. Features of wireless communications and multi-link communication systems operating in accordance with EHT communication protocol and next-generation communication protocol may be referred to herein as "non-legacy" features. In some embodiments of the multi-link communications system described herein, different associated STAs within range of an AP operating according to the EHT communication protocol are configured to operate according to at least one other communication protocol, which defines operation in the same frequency band as the AP, but are generally affiliated with lower data throughputs. The lower data throughput communication protocols (e.g., IEEE 802.11n, IEEE 802.11ac, or IEEE 802.11ax) may be collectively referred to herein as "legacy" communication protocols.

Figure 1:
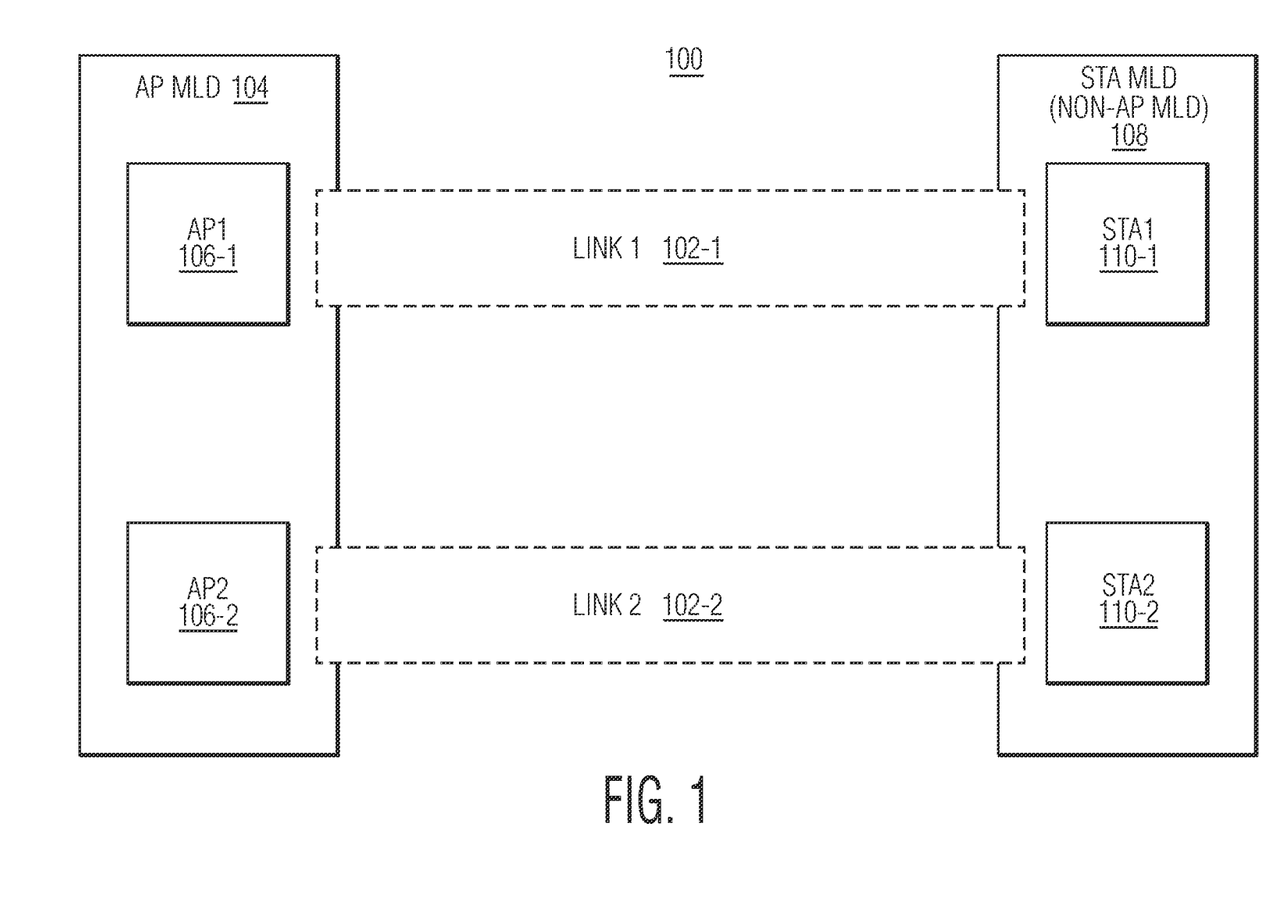
FIG. 1 depicts a multi-link communications system.

FIG. 1 depicts a multi-link communications system that is used for wireless (e.g., WiFi) communications. In the embodiment depicted in FIG. 1, a multi-link communications system 100 includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as access points (APs) 106-1 and 106-2. In some embodiments, the AP MLD 104 implements upper layer Media Access Control (MAC) functionalities (e.g., beacon acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 106-1 or 106-2 of the AP MLD 104 may operate in a different frequency band. For example, the AP 106-1 may operate in a 2.4 gigahertz (GHz) frequency band and the AP 106-2 may operate in a 5 GHz frequency band. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP stations (STAs) 110-1 and 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connect to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. Each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links 102-1 and 102-2. For example, each of the non-AP STAs 110-1 or 110-2 communicates with an AP 106-1 or 106-2 via corresponding communication links 102-1 or 102-2. Although the STA MLD 108 is shown in FIG. 1 as including two non-AP STAs, other embodiments of the STA MLD 108 may include more than two non-AP STAs. In addition, although the AP MLD 104 communicates (e.g., wirelessly communicates) with the STA MLD 108 via multiple links 102-1 and 102-2 in other embodiments, the AP MLD 104 may communicate (e.g., wirelessly communicates) with the STA MLD 108 via more than two communication links.

The EHT communication protocol (i.e., IEEE 802.11be standard) is a next version of the communications protocol that succeeds the IEEE High Efficiency (HE) 802.11ax standard. Additional future versions of the IEEE 802.11 communication protocol can succeed IEEE 802.11ax or IEEE 802.11be. It is desirable that future versions of the communication protocol provide backward compatibility and support interoperability with legacy versions of the IEEE 802.11 communication protocol. Thus, a preamble of a packet compliant with the IEEE 802.11be communication protocol may be distinguishable from a preamble of a packet that is compliant with a legacy communication protocol. As used herein, the term "packet" may refer to, for example, a Physical layer Protocol Data Unit (PPDU), or a PHY packet.

A packet, which includes an EHT preamble that may be transmitted by a communications device operating under the IEEE 802.11be communication protocol to another communications device operating under at least one of a legacy communication protocol and the IEEE 802.11be communication protocol, is described in further detail below with reference to FIG. 2.

Figure 2:
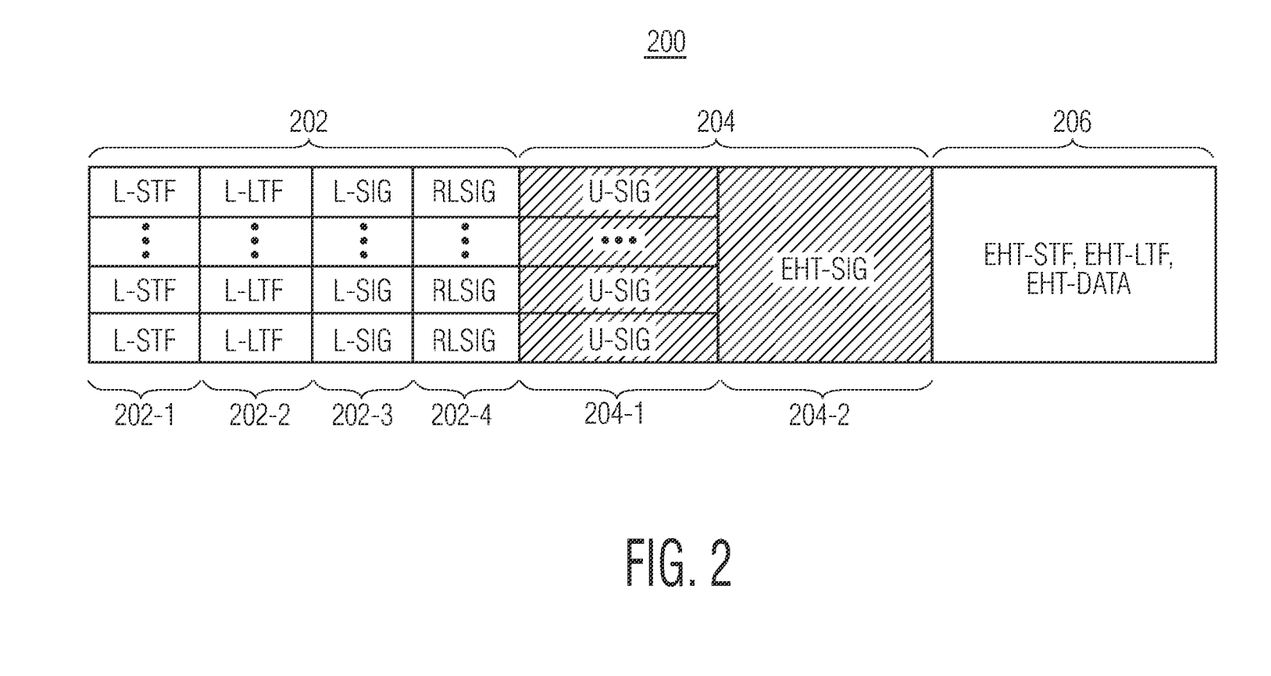
FIG. 2 depicts an example of a non-legacy preamble portion of a packet that may be used in accordance with an embodiment of the invention.

FIG. 2 depicts an example of a non-legacy preamble portion of a packet that may be used in accordance with an embodiment of the invention. In FIG. 2, the non-legacy preamble portion of the packet may be used by a communications device operating according to an EHT communication protocol, such that the preamble of the packet signals information bits that enable coexistence for EHT devices, next-generation devices, and legacy devices. With reference to FIG. 2, one embodiment of the invention may involve a non-legacy preamble portion 200 of a packet (entire packet not shown) including a legacy field 202, a new field 204, and an EHT field 206. In such an embodiment, the legacy field 202 includes a Legacy Short Training Field (L-STF) 202-1, a Legacy Long Training Field (L-LTF) 202-2, a Legacy Signal Field (L-SIG) 202-3, and a Repeated Legacy Signal Field (RLSIG) 202-4. In such an embodiment, the new field 204 may include a Universal Signal Field (U-SIG) 204-1 and an EHT Signal Field (EHT-SIG) 204-2, such that the U-SIG 204-1 may be used to signal information bits for the coexistence of EHT devices and next-generation devices, as well as common information bits for all users, while the EHT-SIG 204-2 may be used to signal other common information bits for all users and all user-specific information. Furthermore, in such an embodiment, the EHT field 206 of the non-legacy EHT preamble 200 may also include an EHT Short Training Field (EHT-STF), an EHT Long Training Field (EHT-LTF), and an EHT data portion (EHT-DATA).

With reference to FIG. 2, a communications device operating under an EHT communication protocol may transmit a non-legacy preamble portion 200 of a packet to an associated communications device operating under at least one of the EHT communication protocol and a legacy communication protocol. However, in the legacy communication protocol, only continuous full bandwidth signaling is allowed for a single-user-multiple-input multiple-output (SU-MIMO) technique or a multiple-user-multiple-input multiple-output (MU-MIMO) technique. Thus, bits that include bandwidth information may be included in a High-Throughput Signal (HT-SIG), a Very High Throughput Signal A-Waveform (VHT-SIGA), or a High Efficiency Signal A-Waveform (HE-SIGA), such that in a legacy communication protocol, HT-SIG, VHT-SIGA, and HE-SIGB are sufficient for SU-MIMO and MU-MIMO signaling. However, in legacy devices, extra resource allocation (RA) information bits in a High Efficiency Signal B-Waveform (HE-SIGB) are needed for orthogonal frequency division multiple access (OFDMA) signaling. Consequently, communications devices operating according to a legacy communication protocol may not allow a preamble portion of a packet to signal punctured SU-MIMO or MU-MIMO transmission and multi-resource unit (multi-RU) allocation to a SU in OFDMA operation. Examples of punctured transmission may involve the transmission of some signals associated with a given frame, and the omission of other signals ordinarily associated with the given frame. As the communication protocol progresses towards the EHT communication protocol and towards the next-generation communication protocols, bandwidth information and resource allocation (RA) information signaling may become more complicated relative to previous generations. Therefore, to efficiently manage signal overhead and to support all bandwidth information and RA information combinations, techniques in accordance with embodiments of the invention are described herein.

In accordance with an embodiment of the invention, a technique for wireless communications may involve in a punctured transmission, encoding bits in a non-legacy preamble portion of a packet to include bandwidth information and resource allocation information, and signaling, in the packet, the bandwidth information and resource allocation (RA) information for at least one of a SU-MIMO technique, a MU-MIMO technique, and an OFDMA technique. Because bits are encoded in a non-legacy preamble portion of the packet, bandwidth information and resource allocation information can be transmitted more effectively while supporting a legacy communication protocol, an EHT communication protocol, and a next-generation communication protocol. A technique for wireless communications that involves encoding bits in a non-legacy preamble portion of a packet to include bandwidth information and resource allocation information, and then signaling the bandwidth information and the resource allocation information is described in further detail below with reference to FIGS. 3A-3B and FIG. 4. In some embodiments, the techniques described herein are applicable to multi-link wireless communications and communications devices while in other embodiments, the techniques described herein are applicable to single-link wireless communications and communications devices.

Figure 3A:
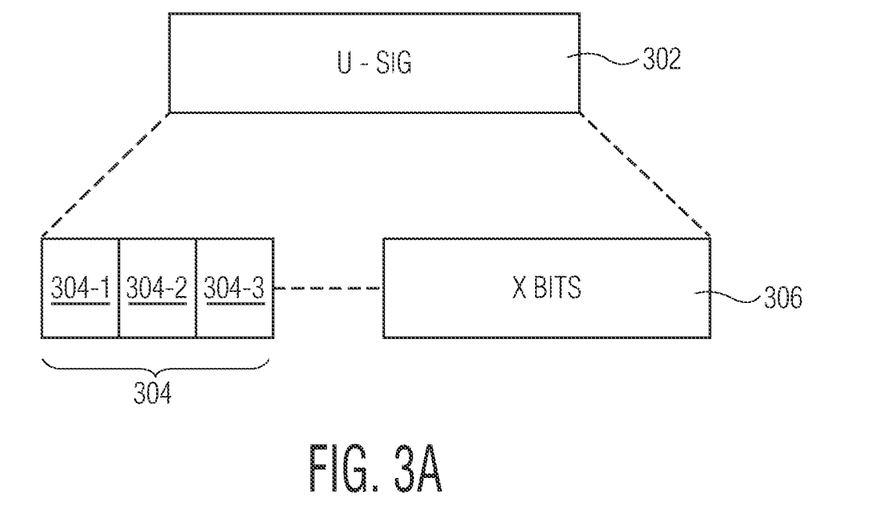
FIG. 3A depicts another example of a non-legacy preamble portion of a packet that may be used in accordance with an embodiment of the invention.

FIG. 3A depicts an example of a non-legacy preamble portion of a packet that may be used in accordance with an embodiment of the invention. In particular, FIG. 3A depicts bits of a U-SIG field that may be implemented in the U-SIG 204-1 of the non-legacy preamble portion 200 of the packet shown in FIG. 2. With reference to FIG. 3A, a U-SIG field, implemented as U-SIG 302 is shown. The U-SIG field as shown in FIG. 3A includes bits that may include bandwidth information to cover at least one of a SU-MIMO technique, a MU-MIMO technique, and an OFDMA technique. U-SIG 302 in FIG. 3A is one example of a format for the U-SIG field that may be implemented in the non-legacy preamble 200. In such an example, U-SIG 302 may include a first set of bits 304 and a second set of bits 306. The first set of bits 304 may be comprised of 3-bits, implemented as a first bit 304-1, a second bit 304-2, and a third bit 304-2 that may be collectively used to signal a packet's entire bandwidth and occupied spectrum (e.g., 20 MHz/40 MHz/80 MHz/160 MHz/320 MHz etc.). The second set of bits 306 may be comprised of X bits, such that X bits may include 5 bits or 6 bits and may be used to signal punctured channel information. Each value of the 5 bits or the 6 bits included in X bits may indicate a puncture pattern. For example, 5 bits for a 160 MHz PPDU may be indicated as "00000", which signals no puncturing, such that all 20 MHz subchannels are used, whereas "00001" indicates the first 20 MHz subchannel is punctured with 140 MHz of channel being used, etc.

Figure 3B:
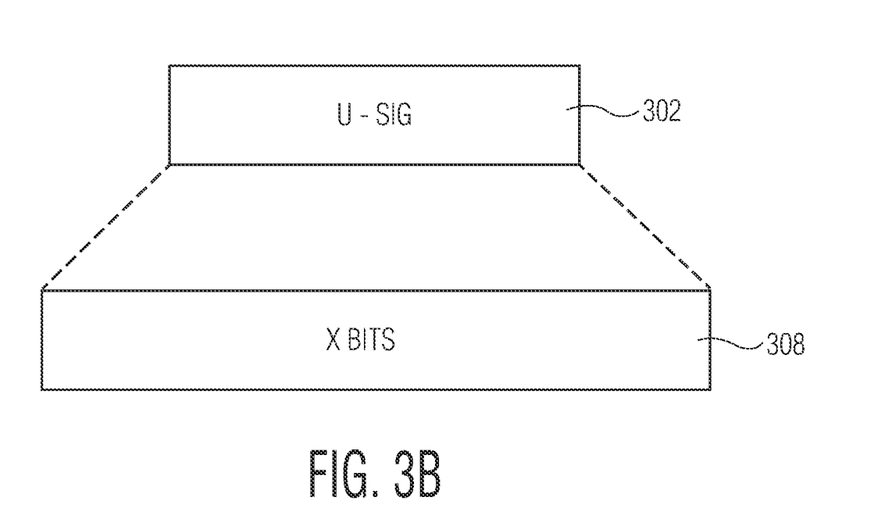
FIG. 3B depicts another example of a non-legacy preamble portion of a packet that may be used in accordance with an embodiment of the invention.

FIG. 3B depicts another example of a non-legacy preamble portion of a packet that may be used in accordance with an embodiment of the invention. In particular, FIG. 3B depicts bits of a U-SIG field that may be implemented in the U-SIG 204-1 of the non-legacy preamble 200 of the packet shown in FIG. 2. With reference to FIG. 3B, a U-SIG field, implemented as U-SIG 302 is shown. The U-SIG field as shown in FIG. 3B includes bits that may include bandwidth information to cover at least one of a SU-MIMO technique, a MU-MIMO technique, and an OFDMA technique. U-SIG 302 in FIG. 3B is another example of a format for the U-SIG field that may be implemented in the non-legacy preamble 200. In such an example, U-SIG 302 includes a set of X bits 308. The set of X bits 308 may be comprised of, for example, at least 8 bits or 9 bits, which may be collectively used to map bandwidth information and punctured cases together to be signaled with X bits in the non-legacy preamble portion 200 of the packet.

With reference to FIG. 3A and FIG. 3B, bits may be combined to determine SU format, MU-MIMO format, or OFDMA format. In one embodiment, one bit is used to signal a SU format, a MU-MIMO format, and an OFDMA format, such that for MU cases, one bit in U-SIG can be added to signal whether resource allocation information bits exist in an EHT-SIG field for MU-MIMO techniques. In another embodiment, two bits are used to signal the SU format, the MU-MIMO format, and the OFDMA format. For OFDMA cases, a third set of bits signal the resource allocation information of the OFDMA, such that the third set of bits are separate from the bandwidth information bits, as HE-SIGB may be needed in the EHT-SIG field to signal resource allocation information. Thus, a communications device operating according to the EHT communication protocol may encode portions of the non-legacy preamble portion of the packet using the format depicted in FIG. 3A or FIG. 3B to have separate bandwidth information and resource allocation information signaling for at least one of a SU-MIMO technique, a MU-MIMO technique, and an OFDMA technique.

Figure 4:
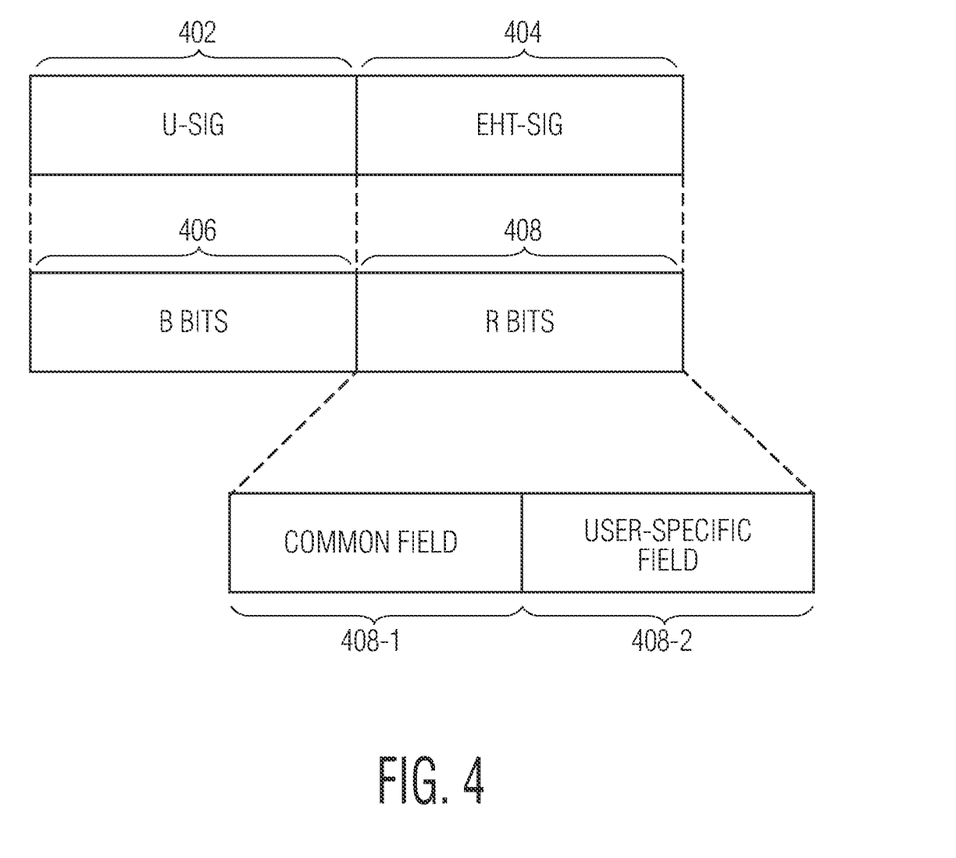
FIG. 4 depicts another example of a non-legacy preamble portion of a packet that may be used in accordance with an embodiment of the invention.

FIG. 4 depicts another example of a non-legacy preamble portion of a packet that may be used in accordance with an embodiment of the invention. In particular, FIG. 4 depicts bits of a U-SIG field and an EHT-SIG that may be implemented in the new field 204 of the non-legacy preamble portion 200 in FIG. 2. With reference to FIG. 4, a U-SIG field, implemented as U-SIG 402, and an EHT-SIG field, implemented as EHT-SIG 404, are shown. The U-SIG 402 as shown in FIG. 4 includes B bits 406, such that the B bits 406 signal bandwidth information (e.g., occupied bandwidth). In one embodiment, the B bits 406 may include 3 bits to signal an occupied channel bandwidth (e.g., 20 MHz/40 MHz/80 MHz/160 MHz/320 MHz or 240 MHz). In another embodiment, the B bits 406 may include 4 bits to signal the occupied channel bandwidth as well as a high-level punctured occupancy (e.g., full bandwidth 20 MHz-320 MHz, plus four 240 MHz bandwidth channels). The EHT-SIG 404 as shown in FIG. 4 includes R bits 408, such that the R bits 408 signal resource allocation information (e.g., spectrum occupancy and puncturing information). In one embodiment, the R bits 408 may employ an 8-bit resource allocation table to signal occupancy and resource allocation information for each channel with at least a size of 20 MHz or larger for all packet formats. Such an embodiment may also involve reusing reserved entries in the 8-bit resource allocation table to signal newly allowed punctured bandwidth and/or multi-RU combinations (e.g., 484+242 RU, 484+996 RU, or 484+242+996 RU). In another embodiment, the R bits 408 may employ the 8-bit resource allocation table only for OFDMA and use a new compressed signaling for SU-MIMO and MU-MIMO. In such an embodiment, the R bits 408 may use 5 bits to signal the existence of each 20 MHz channel. Such an embodiment may also involve reusing the 8-bit resource allocation table for 242/484/996 RU and defining new entries for (242+242) and (242+484) RU, in which 9×N bits are used to signal the resource allocation information for an entire bandwidth and spectrum occupancy, such that 9 bits signal each 80 MHz channel and N is the number of 80 MHz channels (for bandwidth<80 MHz, N=1). Alternatively, such an embodiment may involve reusing the 8-bit resource allocation table for 242/484/996/996*2 RU and defining new entries for all new RU sizes up to 160 MHz, in which 9×N bits are used to signal the resource allocation information for the entire bandwidth and spectrum occupancy, such that 9 bits signal each 160 MHz channel and N is the number of 160 MHz channels (for bandwidth<160 MHz, N=1). Furthermore, R bits 408 of EHT-SIG 404 may also follow a unified content structure comprised of a Common field 408-1 and a User-specific field 408-2. The Common field 408-1 may signal common information bits for all users or single-users (e.g., number of LTFs, guard interval (GI)+LTF size, resource allocation information bits, etc.). In some embodiments, the Common field 408-1 may include a various number of bits depending on if an OFDMA technique or a non-OFDMA technique is being used (e.g., 20-bits for non-OFDMA, or 17+9*N bits for OFDMA, such that N is the number of the RA subfields). The User-specific field 408-2 may signal user-specific information bits (e.g., STA_ID, per-user Modulation and Coding Scheme (MCS), coding, Number of Space Time Streams (NSTS), etc.) and can employ a unified structure when used for single-user and multiple-user formats. In some embodiments, the User-specific field 408-2 may include 22-bits. Thus, a communications device operating according to the EHT communication protocol may encode portions of the non-legacy preamble portion of the packet using the format depicted in FIG. 4 to have unified bandwidth information and resource allocation information signaling for at least one of a SU-MIMO technique, a MU-MIMO technique, and an OFDMA technique.

In the EHT communication protocol, a Basic Service Set (BSS) setup of 160+160 MHz/320 MHz and 160+80 MHz/240 MHz channels may be enabled. In some embodiments, when an STA with 160+160 MHz or 160+80 MHz channel capability is associated with an AP of 160+160 MHz and 160+80 MHz, an allowed PPDU transmission with reduced bandwidth modes can be both 80+80 MHz and 160 MHz. However, in a legacy communication protocol, bits for signaling bandwidth information use one entry for 80+80 MHz and 160 MHz, making communications devices operating according to a legacy communication protocol unable to distinguish PPDU transmission with two reduced bandwidths, as communications devices operating according to the legacy communication protocol require separate signaling of 80+80 MHz and 160 MHz. An approach to support both 80+80 MHz and 160 MHz in a 320 MHz BSS is described herein.

In some embodiments, a BSS setup size of 320 MHz/160+160 MHz or 240 MHz/160+80 MHz may signal an 80+80 MHz and 160 MHz PPDU such that bandwidth information bits may indicate the corresponding large PPDU of 320 MHz/160+160 MHz or 240 MHz/160+80 MHz. In such an embodiment, puncture information may be indicated in a U-SIG and/or an EHT-SIG of a non-legacy preamble to indicate a corresponding unused 80 MHz frequency segment. If the EHT-SIG is needed, at least one of the two options described herein may be employed. In a first option, puncture information may be signaled in a separate block. For example, for 160 MHz in the first option, the puncture information encodes bits (e.g., 0 or 1) as [1111][1111][0000][0000], such that each bit refers to an existence of one 20 MHz bandwidth. For 80+80(1) in the first option, the puncture information encodes bits as [1111][0000][1111][0000], such that each bit refers to an existence of one 20 MHz bandwidth. For 80+80(2) in the first, the puncture information encodes bits as [1111][0000][0000][1111], such that each bit refers to an existence of one 20 MHz bandwidth. In a second option, multiple entries in an RU Allocation Table may be defined to indicate various options. For example, one entry of the second option may signal the upper 160 MHz (e.g., [x x 996 996] or [996 996 x x]), another entry of the second option may signal the upper 80+80(1) (e.g., [996 x 996 x] or [x 996 x 996]), and another entry of the second option may signal 80+80(2) (e.g., [996 x x 996] or [x 996 996 x]), such that each "x" represents a punctured 80 MHz segment.

In some embodiments, an EHT communication protocol may support up to 320 MHz of total bandwidth. To support more 320 MHz transmission opportunity, two sets of 320 MHz channels with 160 MHz overlap can be defined. The new bandwidth transmission for the EHT communication protocol that supports up to 320 MHz may be signaled by at least one of bandwidth bits, puncturing, and RU allocation subfields. In some embodiments, available transmission in one BSS may be comprised of 20 MHz, 40 MHz, 80 MHz, 160 MHz channels, such that the 20 MHz, 40 MHz, 80 MHz, 160 MHz channels have a clear definition within a larger bandwidth BSS. However, 320 MHz transmission may come from an Overlapping BSS (OBSS) with two different channel locations (e.g., a first set or a second set). Thus, a receiver needs to know a physical location in order to distinguish if transmission is from an intra-BSS or an OBSS with a different 320 MHz channel to abort PHY layer decoding to save power and to monitor BSS color collision detection or other MAC functionalities.

An OBSS with different channel locations for 320 MHz transmission is described in further detail with reference to FIGS. 5A-5C.

Figure 5A:
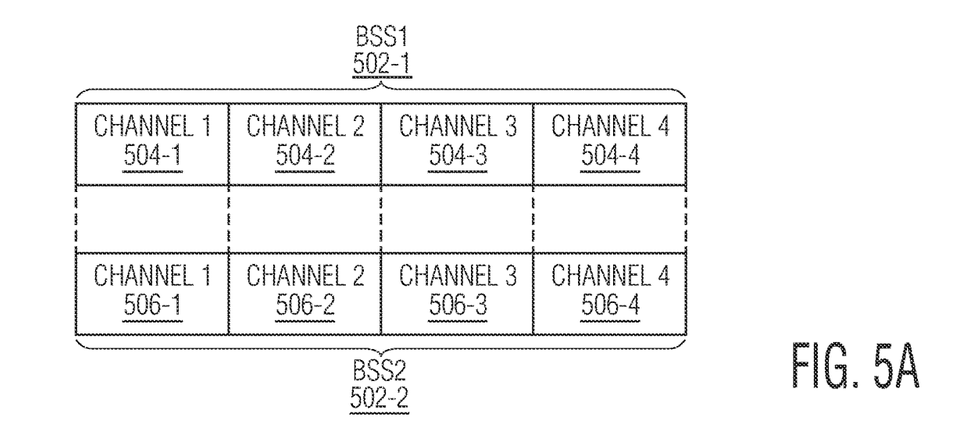
FIG. 5A depicts an example of an OBSS or an incumbent that may exist in accordance with an embodiment of the invention.

FIG. 5A depicts an example of an OBSS or an incumbent that may exist in accordance with an embodiment of the invention. In particular, FIG. 5A depicts an OBSS with overlapping channels of two BSSs where a signal of 320 MHz transmission may occur. With reference to FIG. 5A, a first BSS, implemented as BSS1 502-1 and a second BSS, implemented as BSS2 502-2 are shown. BSS1 is shown as including four 80 MHz channels, implemented as Channel1 504-1, Channel2 504-2, Channel3 504-3, and Channel4 504-4. BSS2 is also shown as including four 80 MHz channels, implemented as Channel1 506-1, Channel2 506-2, Channel3 506-3, and Channel4 506-4. In FIG. 5A, the channels of BSS1 502-1 and the channels of BSS2 502-2 are aligned such that a 320 MHz transmission may be indicated between BSS1 502-1 and BSS2 502-2 on two sets of channels. In some embodiments, the 320 MHz transmission may be indicated from a first set of channels, such that the first set of channels includes Channel1 504-1 and Channel2 504-2 of BSS1 502-1, as well as Channel1 506-1 and Channel2 506-2 of BSS2 502-2. In such an embodiment, Channel1 504-1 of BSS1 502-1 is aligned with Channel1 506-1 of BSS2 502-2 and Channel2 504-2 of BSS1 502-1 is aligned with Channel2 506-2 of BSS2 502-2. In some embodiments, a 320 MHz transmission may be indicated from a second set of channels, such that the second set of channels includes Channel3 504-3 and Channel4 504-4 of BSS1 502-1, as well as Channel3 506-3 and Channel4 506-4 of BSS2 502-2. In such an embodiment, Channel3 504-3 of BSS1 502-1 is aligned with Channel3 506-3 of BSS2 502-2 and Channel4 504-4 of BSS1 502-1 is aligned with Channel4 506-4 of BSS2 502-2.

Figure 5B:
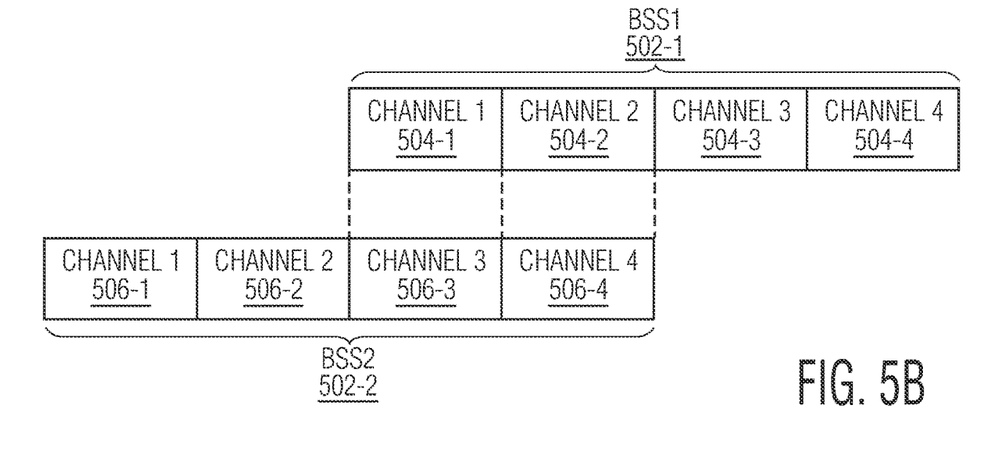
FIG. 5B depicts another example of an OBSS or an incumbent that may exist in accordance with an embodiment of the invention.

FIG. 5B depicts another example of an OBSS or an incumbent that exist in accordance with an embodiment of the invention. In particular, FIG. 5B depicts an OBSS with overlapping channels of two BSSs where a signal of 320 MHz transmission may occur. With reference to FIG. 5B, a first BSS, implemented as BSS1 502-1 and a second BSS, implemented as BSS2 502-2 are shown. BSS1 is shown as including four 80 MHz channels, implemented as Channel1 504-1, Channel2 504-2, Channel3 504-3, and Channel4 504-4. BSS2 is also shown as including four 80 MHz channels, implemented as Channel1 506-1, Channel2 506-2, Channel3 506-3, and Channel4 506-4. In FIG. 5B, the channels of BSS1 502-1 and the channels of BSS2 502-2 are aligned such that a 320 MHz transmission may be indicated between BSS1 502-1 and BSS2 502-2 on one set of channels. In one embodiment, the 320 MHz transmission may be indicated from a first set of channels, such that the first set of channels includes Channel1 504-1 and Channel2 504-2 of BSS1 502-1, as well as Channel3 506-3 and Channel4 506-4 of BSS2 502-2. In such an embodiment, Channel1 504-1 of BSS1 502-1 is aligned with Channel3 506-3 of BSS2 502-2 and Channel2 504-2 of BSS1 502-1 is aligned with Channel4 506-4 of BSS2 502-2.

Figure 5C:
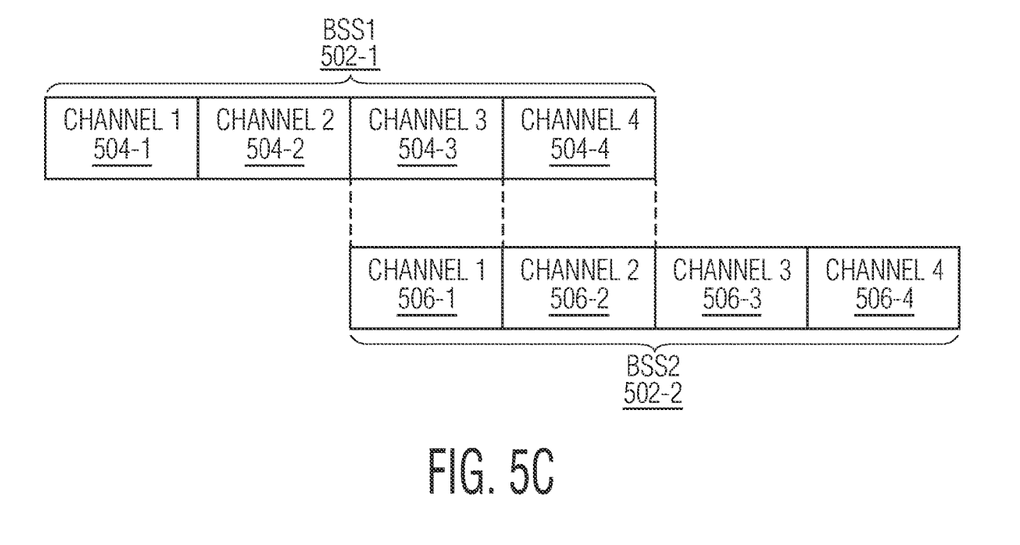
FIG. 5C depicts another example of an OBSS or an incumbent that may exist in accordance with an embodiment of the invention.

FIG. 5C depicts another example of an OBSS or an incumbent that may exist in accordance with an embodiment of the invention. In particular, FIG. 5C depicts an OBSS with overlapping channels of two BSSs where a signal of 320 MHz transmission may occur. With reference to FIG. 5C, a first BSS, implemented as BSS1 502-1 and a second BSS, implemented as BSS2 502-2 are shown. BSS1 is shown as including four 80 MHz channels, implemented as Channel1 504-1, Channel2 504-2, Channel3 504-3, and Channel4 504-4. BSS2 is also shown as including four 80 MHz channels, implemented as Channel1 506-1, Channel2 506-2, Channel3 506-3, and Channel4 506-4. In FIG. 5C, the channels of BSS1 502-1 and the channels of BSS2 502-2 are aligned such that a 320 MHz transmission may be indicated between BSS1 502-1 and BSS2 502-2 on one set of channels. In one embodiment, the 320 MHz transmission may be indicated from a first set of channels, such that the first set of channels includes Channel3 504-3 and Channel4 504-4 of BSS1 502-1, as well as Channel1 506-1 and Channel2 506-2 of BSS2 502-2. In such an embodiment, Channel3 504-3 of BSS1 502-1 is aligned with Channel1 506-1 of BSS2 502-2 and Channel4 504-4 of BSS1 502-1 is aligned with Channel2 506-2 of BSS2 502-2.

With reference to FIGS. 5A-5C, a technique for signaling bandwidth information of a BSS is described herein. In one embodiment, the technique may not distinguish different 320 MHz and 240 MHz transmissions in bandwidth fields. The technique may use bandwidth information bits in U-SIG to signal 20 MHz, 40 MHz, 80 MHz, and 160 MHz/80+80 MHz channels, as well as 320 MHz/160+160 MHz channels. In such a technique, all possible 240 MHz transmission can be signaled as punctured 320 MHz PPDU, in which punctured channel information and/or an RU allocation table may be used. In one embodiment, the bandwidth information bits of the technique allow two different 320 MHz transmissions to be signaled using three bandwidth information bits in U-SIG. For example, the three bandwidth information bits may signal 20 MHz, 40 MHz, 80 MHz, and 160 MHz/80+80 MHz channels. The three bandwidth information bits in U-SIG may also signal a 160+160 MHz channel. In addition, the three bandwidth information bits may signal when a first set of channels allow 320 MHz transmission (320 MHz-1) and when a second set of channels allow 320 MHz transmission (320 MHz-2). In such a technique, all possible 240 MHz and 160+80 MHz transmission can be signaled as punctured 320 MHz PPDU, in which punctured channel information and/or the RU allocation table are used.

According to the EHT communication protocol, 80+80 MHz or 160+160 MHz PHY transmission may be allowed, such that 80 MHz or 160 MHz components may be far from one another, or even on two different bands. As a result, listening STAs may experience difficulty monitoring the spectrum occupancy of OBSS transmission for the listening STA PHY modes, which may cause an OBSS clear channel access (CCA) to be limited due to unknown PPDU frequency spectrum. Considering non-contiguous PHY modes may not be practical, and may cause OBSS interference with unknown channel occupancy, several options for the previous three-bit bandwidth information signaling technique may be implemented to use separate entries to indicate non-contiguous transmissions. In a first option, the three-bit bandwidth information may encode bits to signal 20 MHz, 40 MHz, 80 MHz, 160 MHz, 320 MHz-1, 320 MHz-2, 80+80 MHz, and 160+160 MHz. In a second option, the three-bit bandwidth information may encode bits to signal 20 MHz, 40 MHz, 80 MHz, 160 MHz, 320 MHz-1, 320 MHz-2, 160+160 MHz, and reserved. In a third option, the three-bit bandwidth information may encode bits to signal 20 MHz, 40 MHz, 80 MHz, 160 MHz, 320 MHz-1, 320 MHz-2, reserved, and reserved.

Figure 6:
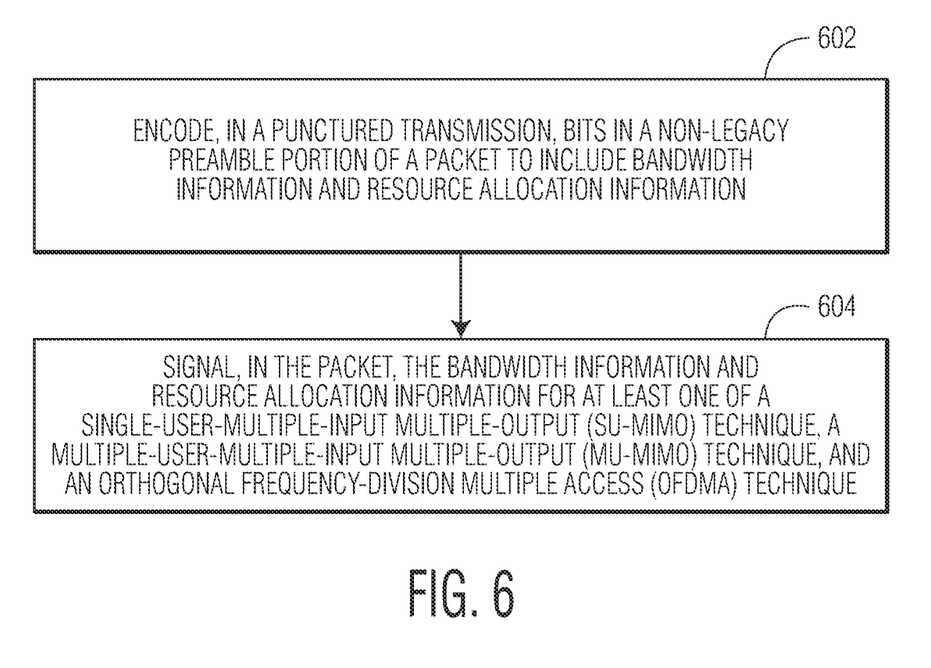
FIG. 6 illustrates a flow diagram of a technique for encoding a non-legacy preamble portion of a packet that may be used in accordance with an embodiment of the invention.

A technique for encoding a non-legacy preamble portion of a packet that may be used in accordance with an embodiment of the invention is described with reference to a flow diagram of FIG. 6. At block 602, bits in a non-legacy preamble portion of a packet may be encoded, in a punctured transmission, to include bandwidth information and resource allocation information. At block 604, the packet may signal the bandwidth information and resource allocation information for at least one of a SU-MIMO technique, a MU-MIMO technique, and an OFDMA technique.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:
   in a punctured transmission, encoding, bits in a non-legacy preamble portion of a packet to include bandwidth information and resource allocation information; and
   signaling, in the packet, the bandwidth information and the resource allocation information that includes spectrum occupancy and puncturing information in a unified manner for at least one of a single-user-multiple-input multiple-output (SU-MIMO) technique, a multiple-user-multiple-input multiple-output (MU-MIMO) technique, and an orthogonal frequency-division multiple access (OFDMA) technique.

2. The method of claim 1, wherein a first set of bits signal the packet's entire bandwidth; and
   wherein, the first set of bits are comprised of 3-bits for the packet's entire bandwidth.

3. The method of claim 1, wherein a second set of bits signal punctured channel information; and
   wherein, the second set of bits are comprised of at least 5-bits.

4. The method of claim 1, wherein a third set of bits signal the resource allocation information of the OFDMA technique.

5. The method of claim 1, wherein at least 8 bits are used to signal the resource allocation information for each unit of bandwidth information.

6. The method of claim 1, wherein 9×N bits are used to signal the resource allocation information for an entire bandwidth.

7. A communications device, the communications device comprising:
   a processor configured to:
   encode, bits in a non-legacy preamble portion of a packet to include bandwidth information and resource allocation information; and
   signal, in the packet, the bandwidth information and the resource allocation information that includes spectrum occupancy and puncturing information in a unified manner for at least one of a single-user-multiple-input multiple-output (SU-MIMO) technique, a multiple-user-multiple-input multiple-output (MU-MIMO) technique, and an orthogonal frequency-division multiple access (OFDMA) technique.

8. The communications device of claim 7, wherein a first set of bits signal the packet's entire bandwidth; and
   wherein, the first set of bits are comprised of 3-bits for the packet's entire bandwidth.

9. The communications device of claim 7, wherein a second set of bits signal punctured channel information; and
   wherein, the second set of bits are comprised of at least 5-bits.

10. The communications device of claim 7, wherein a third set of bits signal the resource allocation information of the OFDMA technique.

11. The communications device of claim 7, wherein at least 8 bits are used to signal the resource allocation information for each unit of bandwidth information.

12. The communications device of claim 7, wherein 9×N bits are used to signal the resource allocation information for an entire bandwidth.

* * * * *